(12) United States Patent
Sugai et al.

(10) Patent No.: US 8,349,763 B2
(45) Date of Patent: Jan. 8, 2013

(54) CARBON MONOXIDE REDUCTION CATALYST FOR SMOKING ARTICLES AND METHOD FOR PRODUCING THE SAME

(75) Inventors: Kazunori Sugai, Tokyo (JP); Yasunobu Inoue, Tokyo (JP); Kiyohiro Sasakawa, Tokyo (JP); Mitsuru Kondo, Kyoto (JP); Tsutomu Sakai, Kyoto (JP); Sadako Imai, Kyoto (JP); Fumiko Murata, Kyoto (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 13/250,259

(22) Filed: Sep. 30, 2011

(65) Prior Publication Data

US 2012/0015803 A1 Jan. 19, 2012

Related U.S. Application Data

(63) Continuation of application No. PCT/JP2010/056021, filed on Apr. 1, 2010.

(30) Foreign Application Priority Data

Apr. 3, 2009 (JP) .................................. 2009-091210

(51) Int. Cl.
*B01J 23/70* (2006.01)
*B01J 23/74* (2006.01)
*C01G 49/02* (2006.01)
(52) U.S. Cl. ......................... 502/338; 423/632; 423/633
(58) Field of Classification Search .................. 502/338; 423/632, 633
See application file for complete search history.

(56) References Cited

U.S. PATENT DOCUMENTS

| | | | | |
|---|---|---|---|---|
| 4,448,895 A | * | 5/1984 | Ono et al. | 502/304 |
| 4,532,229 A | * | 7/1985 | Fiato et al. | 502/330 |
| 4,568,662 A | * | 2/1986 | Bialy et al. | 502/257 |
| 4,624,942 A | * | 11/1986 | Dyer et al. | 502/330 |
| 4,624,967 A | * | 11/1986 | Fiato et al. | 518/700 |
| 5,580,839 A | * | 12/1996 | Huffman et al. | 502/338 |
| 5,595,577 A | | 1/1997 | Bensalem et al. | |
| 5,759,947 A | * | 6/1998 | Zhou | 502/324 |
| 6,060,420 A | | 5/2000 | Munakata et al. | |
| 6,100,215 A | * | 8/2000 | Sasaki et al. | 502/201 |
| 6,484,367 B1 | * | 11/2002 | Caveney et al. | 24/16 PB |
| 6,864,384 B2 | * | 3/2005 | Brazdil et al. | 558/325 |
| 7,037,876 B2 | * | 5/2006 | O'Brien et al. | 502/305 |
| 7,199,077 B2 | * | 4/2007 | Hu et al. | 502/325 |

(Continued)

FOREIGN PATENT DOCUMENTS

JP 7-145395 A 6/1995

(Continued)

OTHER PUBLICATIONS

International Search Report for PCT/JP2010/056021 dated May 25, 2010.

(Continued)

*Primary Examiner* — Cam N. Nguyen
(74) *Attorney, Agent, or Firm* — Birch, Stewart, Kolasch & Birch, LLP

(57) ABSTRACT

A carbon monoxide reduction catalyst for smoking articles includes particles, 90% by volume or more of which have a particle diameter within a range of 1 to 100 μm. Each particle includes a transition metal oxide generated by heating a transition metal salt of an organic acid.

7 Claims, 5 Drawing Sheets

U.S. PATENT DOCUMENTS

| | | |
|---|---|---|
| 7,271,126 B2 * | 9/2007 | Smith et al. .................. 502/326 |
| 7,565,680 B1 * | 7/2009 | Asmussen ..................... 725/135 |
| 7,939,463 B1 * | 5/2011 | O'Brien et al. ............... 502/338 |
| 2003/0188758 A1 | 10/2003 | Hajaligol et al. |
| 2004/0007498 A1 * | 1/2004 | Gislason et al. ................ 208/15 |
| 2004/0250827 A1 | 12/2004 | Deevi et al. |
| 2005/0263163 A1 | 12/2005 | Yadav et al. |

FOREIGN PATENT DOCUMENTS

| | | |
|---|---|---|
| JP | 9-86928 A | 3/1997 |
| JP | 9-140370 A | 6/1997 |
| JP | 2005-522206 A | 7/2005 |
| JP | 2005-527205 A | 9/2005 |
| JP | 2007-527698 A | 10/2007 |
| WO | WO 03/086115 A1 | 10/2003 |
| WO | WO 2005/025342 A | 3/2005 |
| WO | WO 2007/108878 A2 | 9/2007 |

OTHER PUBLICATIONS

PCT/ISA/237 for PCT/JP2010/056021 dated May 25, 2010.
International Preliminary Examination Report for PCT/JP2010/056021 (PCT/IPEA/408, PCT/IPEA/409) dated Nov. 30, 2010.

* cited by examiner

US 8,349,763 B2

CARBON MONOXIDE REDUCTION CATALYST FOR SMOKING ARTICLES AND METHOD FOR PRODUCING THE SAME

CROSS REFERENCE TO RELATED APPLICATIONS

This application is a Continuation Application of PCT Application No. PCT/JP2010/056021, filed Apr. 1, 2010 and based upon and claiming the benefit of priority from prior Japanese Patent Application No. 2009-091210, filed Apr. 3, 2009, the entire contents of all of which are incorporated herein by reference.

BACKGROUND OF THE INVENTION

1. Field of the Invention

The present invention relates to a carbon monoxide reduction catalyst for smoking articles and a method for producing the same.

2. Description of the Related Art

It has been proposed that, in order to remove carbon monoxide present in cigarette mainstream smoke, a noble metal catalyst or a transition metal oxide catalyst is added to shredded tobacco, a cigarette paper or a filter. These catalysts promote a reaction that carbon monoxide is oxidized and converted into carbon dioxide. For example, Patent Literature 1 discloses that nano-scale metal particles or nano-scale metal oxide particles are carried on carrier particles having a high surface area and are added in shredded tobacco and the like in order to convert carbon monoxide into carbon dioxide. Further, Patent Literature 2 describes that a partially reducing additive in the form of nano-particles is added as a carbon monoxide reduction agent to a cut tobacco filler. Patent Literature 3 describes that nano-particles of, for example, a metal oxide are physically deposited on, for example, a tobacco cut filler, as an oxidizer that converts carbon monoxide into carbon dioxide. As mentioned above, these three Patent Literatures disclose the use of nano-particles of a metal oxide. However, nano-particles are not easily handled when they are applied to smoking articles, giving rise to the complexity of a process of producing smoking articles. Further, in Patent Literature 1, a nano-catalyst is supported by a carrier and therefore, the production cost tends to increase because the carrier is used. Patent Literature 4 discloses that when a carbonaceous heat source used in smoking articles is produced, a carbonaceous heat source material is treated with a sol containing a metal oxide precursor to be converted into a metal oxide catalyst that converts carbon monoxide into a harmless material.

CITATION LIST

Patent Literature

Patent Literature 1: Jpn. PCT National Publication No. 2007-527698

Patent Literature 2: Jpn. PCT National Publication No. 2005-522206

Patent Literature 3: U.S. Patent Application Publication No. 2005/0263163

Patent Literature 4: Jpn. Pat. Appln. KOKAI Publication No. 7-145395

BRIEF SUMMARY OF THE INVENTION

Technical Problem

The inventors of the present invention have confirmed that if a nano-scale catalyst is used, the nano-particles are coagulated at high temperatures and the catalyst is significantly deteriorated in the capability to oxidize carbon monoxide.

Therefore, it is an object of the present invention to provide a carbon monoxide reduction catalyst for smoking articles which can reduce the amount of carbon monoxide in tobacco mainstream smoke, is easily handled and is not lowered in monoxide oxidizing capability even at high temperatures, and also to provide a method for producing a carbon monoxide reduction catalyst without performing complex processes.

Solution to Problem

According to a first aspect of the present invention, there is provided a carbon monoxide reduction catalyst for smoking articles, comprising particles, 90% by volume or more of which have a particle diameter within a range of 1 to 100 µm, each particle comprising a transition metal oxide generated by heating a transition metal salt of an organic acid.

According to a second aspect of the present invention, there is provided a method for producing a catalyst reducing carbon monoxide in tobacco mainstream smoke, comprising heating particles of a transition metal salt of an organic acid.

Advantageous Effects of Invention

The particles of the carbon monoxide reduction catalyst of the present invention are not nano-particles and therefore have superior handling characteristics in the production of smoking articles such as cigarettes. At high temperatures, the carbon monoxide reduction catalyst of the present invention is not coagulated and keeps the capability to oxidize carbon monoxide. Further, the carbon monoxide reduction catalyst of the present invention needs no carrier which is necessary for a general catalyst. Moreover, the production method of the present invention does not require a complicated process.

DETAILED DESCRIPTION OF THE INVENTION

Figure 1:
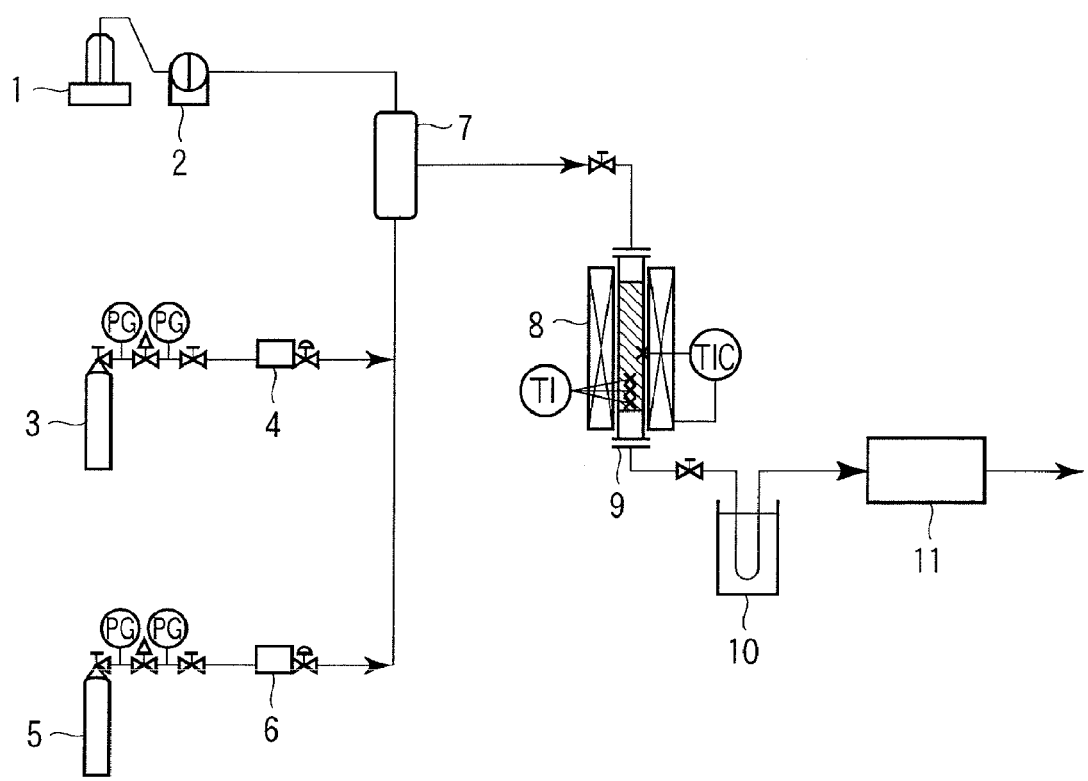
FIG. 1 is a schematic structural view of a device used to analyze the carbon monoxide reduction capability of a catalyst.

Various embodiments of the present invention will be explained in detail below.

A carbon monoxide reduction catalyst according to the present invention is in the form of particles and 90% by volume or more of the particles have particle diameters within the range of from 1 to 100 μm. Each particle comprises a transition metal oxide produced by heating a transition metal salt of an organic acid.

Since 90% by volume or more of the particles of the carbon monoxide reduction catalyst according to the present invention have particle diameters within the range of from 1 to 100 μm, the catalyst of the present invention is different from a conventional catalyst consisting of nano-particles. When 10% or more by volume of the catalyst particles have particle diameters of less than 1 μm, the particles are too small and there is therefore a tendency that the particles are coagulated, bringing about handling difficulty. When 10% by volume or more of the catalyst particles have particle diameters exceeding 100 μm, the catalyst cannot be highly dispersed when it is added to a filler material or cigarette paper in the production of smoking articles and this is disadvantageous. The particle size distribution of the catalyst particles may be measured using, for example, the LA-910 laser diffraction/scattering type particle size distribution measuring device manufactured by Horiba Ltd.

The carbon monoxide reduction catalyst of the present invention preferably has a BET specific surface area of 10 to 200 m$^2$/g. When the BET specific surface area is less than 10 m$^2$/g, the catalyst tends to be deteriorated in the carbon monoxide capability and this is undesirable. When the BET specific surface area exceeds 200 m$^2$/g, it is highly possible that the production process is complicated. Here, the BET specific surface area can be measured by the multi-point method measurement according to the nitrogen adsorption method using a specific surface area/pore distribution measuring device ASAP2010 manufactured by Shimadzu Corporation.

Moreover, the carbon monoxide reduction catalyst of the present invention preferably has nanopores having an average pore diameter within the range of from 2 to 20 nm. When the average pore diameter is less than 2 nm, water molecules necessary for a shift reaction (CO+H$_2$O→CO$_2$+H$_2$) on the surface of the catalyst scarcely penetrate into the pores and the carbon monoxide reduction capability is sometimes deteriorated. When the average pore diameter exceeds 20 nm on the other hand, the contact efficiency between carbon monoxide and the catalyst is sometimes deteriorated. Here, the pore size distribution can be measured using the mercury intrusion porosimetry. In the measurement of the pore size distribution, for example, a full automatic pore size distribution measuring device (Pore Master 60-GT, manufactured by Quanta Chrome Co.) may be used.

The carbon monoxide reduction catalyst of the present invention comprises a transition metal oxide generated by heating particles of a transition metal salt of an organic acid.

The transition metal is preferably at least one metal selected from the group consisting of Ti, Mn, Fe, Co, Ni, Cu, Y, Zr, Nb, Mo, Ru, Rh, Pd, Ag, Ce, Ir, Pt and Au. Among these, iron is particularly preferable. Here, in the case where iron is used as the transition metal, it is assumed that because iron forms an octahedral 6-coordination structure, the ligands are detached at high temperatures to form a metal oxide which is not coagulated and has a stable structure, which is therefore considered to be superior in carbon monoxide reduction capability at high temperatures.

As the organic acid, fumaric acid or citric acid is preferable though any organic acids may be used.

From the above, iron citrate and iron fumarate are particularly preferable as the transition metal salt of an organic acid.

As mentioned above, the catalyst for smoking articles according to the present invention has superior handling characteristics in the production of smoking articles because it is not nano-particles. Because the catalyst for smoking articles according to the present invention has a nanopore structure showing a pore distribution with an average pore diameter ranging from 2 to 20 nm though it is not nano-sized, it achieves a BET specific surface area as high as 10 to 200 m$^2$/g. Further, since the catalyst of the present invention is not nano-particles, it is not coagulated at high temperatures, can keep a high BET specific surface area as it is and can keep its carbon monoxide reduction capability. Further, the catalyst of the present invention unnecessarily needs a carrier which is usually required for catalysts.

The organic acid transition metal salt particles are preferably heated (or baked) at 200 to 700° C. When the heating temperature is less than 200° C., there is a fear that the organic acid is insufficiently decomposed with the result that the catalyst obtained after the heating tends to be deteriorated in performance. When the heating temperature exceeds 700° C. on the other hand, the prepared catalyst tends to be deteriorated in carbon monoxide reduction capability. The organic acid transition metal salt particles are preferably heated (or baked) particularly at 500 to 600° C. The heating is carried out preferably for 0.1 to 5 hours and more preferably for 0.5 to 3 hours.

The above organic acid transition metal salt particles are preferably heated in an atmosphere of CO$_2$, N$_2$, H$_2$O or CO gas or in an atmosphere of a mixture of two or more of these gases. It is particularly preferable to heat the organic acid transition metal salt particles in the above gas mixture atmosphere. Preferable examples of the gas mixture include a gas mixture of CO$_2$: 5 to 20 mol %/N$_2$: balance, a gas mixture of CO: 1 to 10 mol %/CO$_2$: 5 to 20 mol %/H$_2$O: 5 to 20 mol %/N$_2$: balance and a gas mixture of H$_2$O: 5 to 20 mol %/N$_2$: balance.

90% by volume or more of the organic acid transition metal salt particles which are the raw material preferably have particle diameters of from 1 to 100 μm. Although the organic acid transition metal salt particles which are the raw material by itself have no pore, pores are formed, for example, by the decomposition of the organic acid part of the organic acid transition metal salt while substantially keeping original particle diameters, resulting in increase of BET specific surface area when the organic acid transition metal salt particles are heated under the above heating condition and particularly in the above gas atmosphere. The BET surface area, which depends on pore diameter, can be adjusted by the heating temperature and heating time of the organic acid transition metal salt particles. When organic acid transition metal salt particles 90% by volume or more of which have particle diameters of 1 to 100 μm are heated/baked at the above heating temperature (particularly 500 to 600° C.) for the above heating time (particularly 0.5 to 3 hours) in the gas atmosphere (particularly in the above preferable gas mixture atmosphere), the above BET specific surface area and average pore diameter can be attained.

The creation of the transition metal oxide when the organic acid transition metal salt is heated can be confirmed by powder X-ray diffraction analysis. As the powder X-ray diffractometer, an automatic X-ray diffractometer (MXP3, manufactured by Mac Science) may be used.

When a smoking article is manufactured using the carbon monoxide reduction catalyst of the present invention, the catalyst particles may be sprayed on/applied to, or kneaded in, cigarette paper or tobacco filler, or added when cigarette paper is made. In the case of these methods, the particle diameter of the catalyst particles for smoking articles is more preferably 1 to 30 μm. Particles of less than 1 μm, which are close to nano-scale particles, have slight difficulty in handling. Further, if the particle diameter is too large, this is disadvantageous because the catalyst cannot be highly dispersed when it is carried on a filler material or cigarette paper. Moreover, when the carbon monoxide reduction catalyst of the present invention is sprayed on, or applied to, cigarette paper, or is added when the paper is made, the particle diameter of the catalyst particles is even more preferably about 1 μm.

EXAMPLES 1 AND 2

In Examples 1 and 2, catalysts according to the present invention were prepared from catalyst precursors, and the performance of the catalysts was evaluated.

<Catalyst Precursor>

As the catalyst precursor, iron citrate (Example 1) or iron fumarate (Example 2) containing iron as an element in an amount shown in Table 1 below was used. As iron citrate, a product manufactured by Nacalai Tesque Co., Ltd., was used, and as iron fumarate, a product manufactured by Wako Pure Chemical Industries, Ltd., was used. As each organic acid iron salt, particles which passed through a 75 μm screen were used. The average BET specific surface area of these particles was found by the multi-point method measurement according to the nitrogen adsorption method using a specific surface area/pore distribution measuring device ASAP2010 (manufactured by Shimadzu Corporation). The results are described also in Table 1. A sample was statically allowed to stand at ambient temperature under reduced pressure prior to the measurement of BET specific surface area (this applies also to the following measurements of BET specific surface area).

<Preparation of a Catalyst>

The above organic acid iron salts (iron citrate and iron fumarate) were respectively converted into iron oxide by heating the salt at 600° C. in a gas atmosphere containing 10 mol % of $CO_2$ with the balance of nitrogen for 3 hours. It was confirmed that, by an automatic X-ray diffractometer (MXP3, manufactured by Mac Science), iron citrate and iron fumarate were each converted into $Fe_3O_4$ by this heat treatment. At this time, the product obtained after the above heat treatment was finely divided by using an agate mortar and filled in a glass sample plate to analyze. The condition of analysis was as follows: X-ray: Cu Kα ray, power: 40 kV, 20 mA, scanning speed: 4 deg/minute. Further, the average BET surface area of the obtained catalyst was measured in the same manner as above. The results are shown also in Table 1.

<Evaluation of Catalyst Performance>

Figure 2:
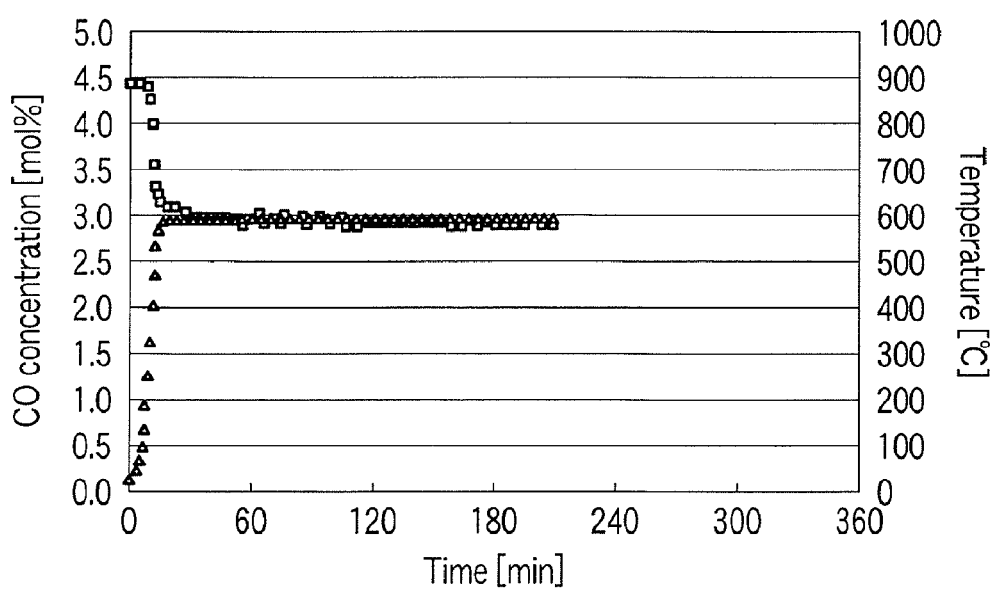
FIG. 2 is a graph showing a variation, with time, in the concentration of carbon monoxide in a model gas treated with an iron oxide ($Fe_3O_4$) catalyst derived from iron citrate.
Figure 3:
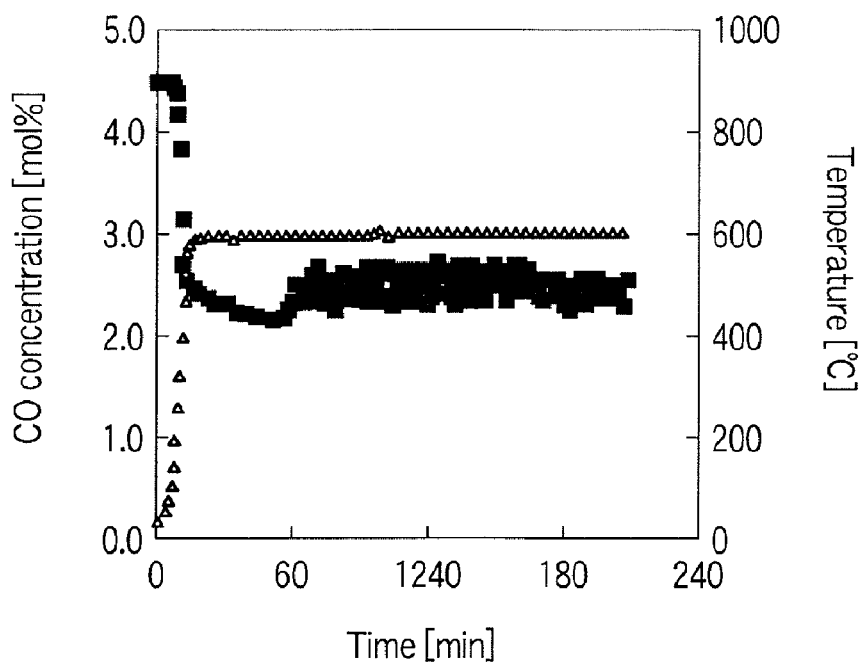
FIG. 3 is a graph showing a variation, with time, in the concentration of carbon monoxide in a model gas treated by an iron oxide ($Fe_3O_4$) catalyst derived from iron fumarate.

FIG. 1 is a schematic structural view of a device for analyzing the catalytic performance (carbon monoxide reduction capability) of a catalyst. The catalysts obtained in Examples 1 and 2 were respectively filled in a reaction tube 9 disposed in a heating furnace 8. Carbon monoxide (CO) and carbon dioxide ($CO_2$) were supplied from gas cylinders 3 and 5 through mass flowmeters 4 and 6 respectively, while water was weighed by an electronic balance 1 and supplied by a metering pump 2. The above water was made to flow through an evaporator 7 (200° C.) together with the above CO gas and $CO_2$ gas. The water was vaporized into water vapor. Thus, a model gas (CO: 4 mol %, $CO_2$: 8 mol %, $H_2O$: 10 mol %, nitrogen: balance) was prepared in the evaporator 7. The flow rate of the model gas was set such that its space velocity (SV) was 500,000 $h^{-1}$ and made to flow through the layer of the catalyst (hereinafter referred to simply as a "packed bed") filled in the reaction tube 9. The packed bed was heated until the temperature reached 600° C. and then, the packed bed was kept at that temperature. Then, the model gas was made to flow for 3.5 hours. In FIG. 1, PG is a pressure gauge, TIC is a temperature gauge used to measure the temperature of the tube wall of the reaction tube 9 and TI is a temperature gauge used to measure the temperature of the packed bed. The temperature measured by the temperature gauge TIC was used as a control monitor temperature when heating the reaction tube 9 by the furnace 8. The gas flowed out of the reaction tube 9 was made to flow through a cooling trap 10 and then, the amount of carbon monoxide was quantitatively measured in predetermined time intervals by an infrared gas analyzer 11 (VIA-510, manufactured by Horiba Ltd., according to the nondispersive infrared absorption method). A variation with time in the measured concentration of CO in the gas discharged from the reaction tube 9 is shown in FIG. 2 and FIG. 3. In FIG. 2, a variation in the concentration of CO with time in the case of using the catalyst of Example 1 is shown by the square mark and the temperature of the packed bed is shown by the triangle mark. In FIG. 3, a variation in the concentration of CO with time in the case of using the catalyst of Example 2 is shown by the solid square mark and the temperature of the packed bed is shown by the triangle mark.

Moreover, the CO oxidation amount, CO/Fe, and CO removal rate were calculated based on the above results of measurement of carbon monoxide. The results are shown also in Table 1. The BET specific surface area of the catalyst after the performance of the catalyst was evaluated as shown above was measured in the same manner as above. The results are shown also in Table 1.

COMPARATIVE EXAMPLE 1

Figure 4:
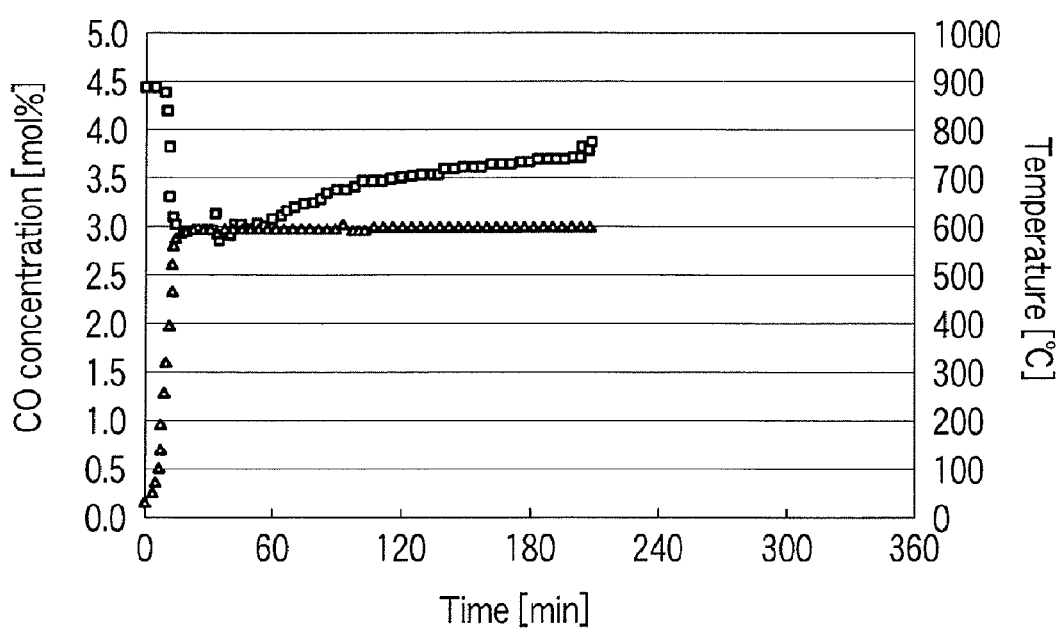
FIG. 4 is a graph showing a variation, with time, in the concentration of carbon monoxide in a model gas treated with $Fe_3O_4$ nano-powder catalyst.

The performance of a catalyst consisting of a $Fe_3O_4$ nano-powder (manufactured by Sigma-Aldrich Corporation) was evaluated in the same manner as in Examples 1 and 2 except that the powder was filled in the reaction tube 9. The results are shown in FIG. 4 and in Table 1. In FIG. 4, a variation in the concentration of CO with time in the case of using the $Fe_3O_4$ nano-powder is shown by the square mark and the temperature of the packed bed is shown by the triangle mark. As is found from FIG. 4, the concentration of CO is increased with time at 600° C. when the $Fe_3O_4$ nano-powder is used as the catalyst.

In addition, the average BET specific surface area of the above $Fe_3O_4$ nano-powder catalyst itself and the average BET specific surface area of the above $Fe_3O_4$ nano-powder catalyst after the performance of the catalyst was evaluated were measured in the same manner as in Examples 1 and 2. The results are shown also in Table 1.

TABLE 1

| | Precursor | | Catalyst | | Amount of iron [a] | | Performance of catalyst | | | Average BET specific surface area of the catalyst after the performance of the catalyst is evaluated |
|---|---|---|---|---|---|---|---|---|---|---|
| | Compound | Average BET specific surface area | Compound | Average BET specific surface area | | | CO oxidation amount [b] | CO/Fe [c] | CO removal rate [d] | |
| | — | ($m^2/g$) | — | ($m^2/g$) | mg | mmol | % | % | % | ($m^2/g$) |
| EX. 1 | Iron (II) citrate | 0.47 | $Fe_3O_4$ | 65.1 | 0.15 | 180.5 | 180.3 | 166.2 | 34.9 | 73.2 |
| Ex. 2 | Iron (II) fumarate | 1.48 | $Fe_3O_4$ | 157.8 | 0.15 | 180.5 | 243.7 | 224.6 | 51.7 | 171.4 |
| Comp. Ex. 1 | — | — | $Fe_3O_4$ nanopowder | 42.1 | 0.15 | 180.5 | 133.2 | 122.8 | 35.1 | 10.2 |

[a] Amount of iron Mass or mol of iron contained in the precursor or filled catalyst.
[b] CO oxidation amount A value obtained by multiplying a difference (mol %) in concentration between carbon monoxide in the model gas and carbon monoxide in the gas discharged from the reaction tube by the flow rate (amount by mol per hour) of the model gas to integrate the obtained value with respect to time (3.5 hours), and by multiplying the integrated value by the flow rate (mol per hour) of carbon monoxide gas to integrate the obtained value with respect to time.
[c] CO/Fe Co oxidation amount per mol of an iron element
[d] CO removal rate Conversion rate of CO into $CO_2$.

As is clear from Table 1, the catalysts of Examples 1 and 2 significantly oxidized carbon monoxide. The amount of carbon monoxide oxidized by each iron oxide derived from iron citrate of Example 1 and from iron fumarate of Example 2 was higher than that of the iron oxide nano-powder of Comparative Example 1. Further, the amount of oxidized carbon monoxide per mol of iron was higher in Examples 1 and 2 than in Comparative Example 1, so that a higher catalyst efficiency was obtained in Examples 1 and 2 than in Comparative Example 1. With regard to the carbon monoxide removal rate, Example 1 had the same level as Comparative Example 1 and Example 2 achieved a higher removal rate than Comparative Example 1. Further, the average BET specific surface area of each catalyst obtained in Examples 1 and 2 was higher than that of the catalyst obtained in Comparative Example 1, and particularly the catalyst (derived from iron fumarate) of Example 2 had a very high value.

Further, it was also found that the iron oxides derived from the organic acid iron salts of Examples 1 and 2 were not coagulated under the heating conditions and kept a high specific surface area even after the above evaluation of performance at the high temperature. On the other hand, the iron oxide nano-powder of Comparative Example 1 was largely reduced in BET specific surface area after the above catalyst performance was evaluated. This reason is considered to be due to the coagulation of nano-particles. It was also found that the nano-powder of Comparative Example 1 was deteriorated in carbon monoxide reduction capability in the heat treatment.

EXAMPLE 3A

Figure 5:
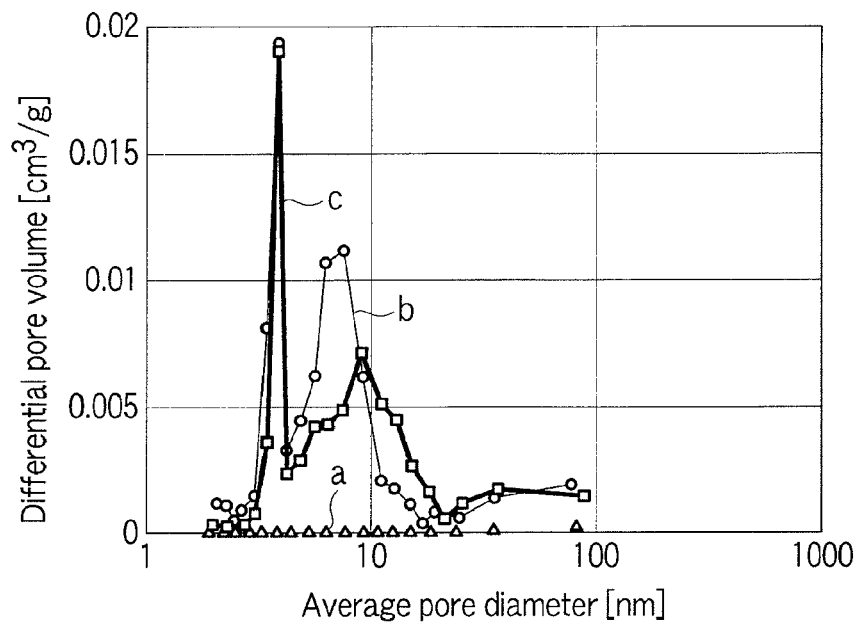
FIG. 5 is a graph showing the pore distributions of iron citrate, and a catalyst ($Fe_3O_4$) prepared from an iron citrate before and after the performance of the catalyst is evaluated.

The pore distribution of the iron citrate particles used in Example 1, the pore distribution of the catalyst ($Fe_3O_4$ derived from iron citrate) particles prepared by heating the iron citrate particles in Example 1, and the pore distribution of the catalyst after the above catalyst performance was evaluated (heating at 600° C. for 3.5 hours) were measured by a full automatic pore size distribution measuring device (Pore Master 60-GT, manufactured by Quanta Chrome Co.). The results are shown in FIG. 5. In FIG. 5, the line a (triangular mark) shows the results of iron citrate, the line c (square mark) shows the results of the catalyst prepared from iron citrate by heating, and the line b (circular mark) shows the results of the catalyst after its performance has been evaluated.

As shown in FIG. 5, the catalyst ($Fe_3O_4$) particles derived from iron citrate have nanopores (line c) though the iron citrate particles have almost no pore (line a). Further, the $Fe_3O_4$ particles maintain a nanopore structure even after heated at 600° C. for 3.5 hours (line b).

EXAMPLE 3B

Figure 6:
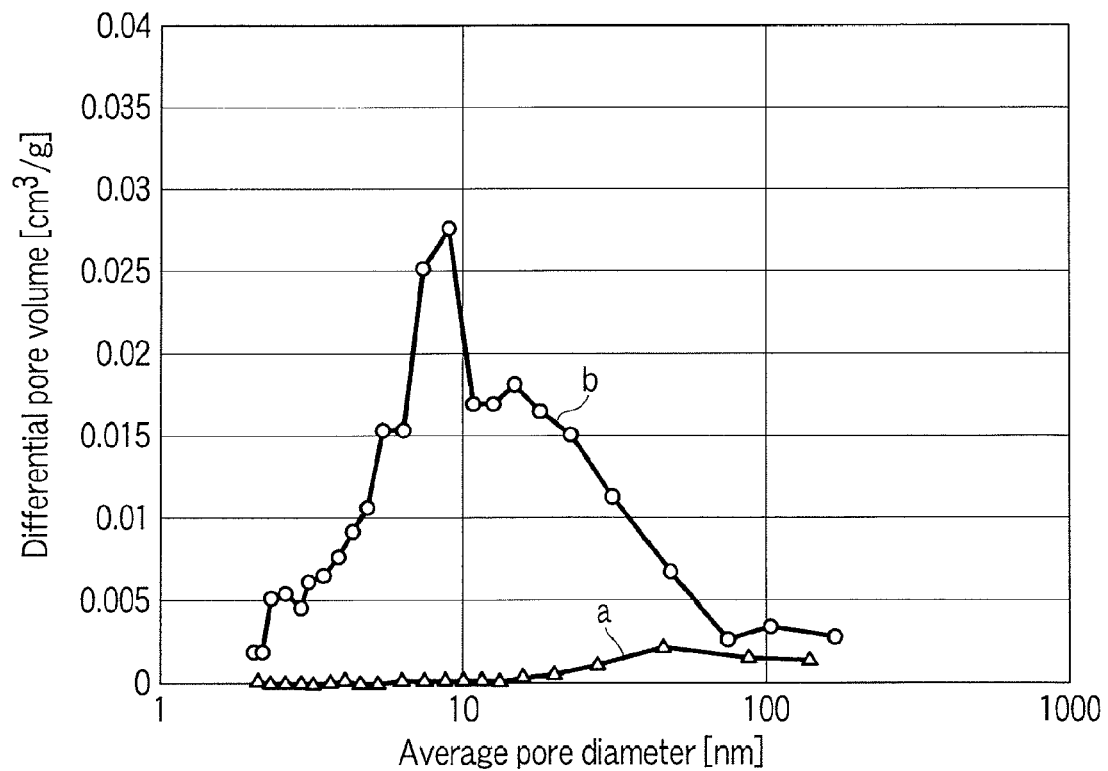
FIG. 6 is a graph showing the pore distributions of iron fumarate, and a catalyst ($Fe_3O_4$) prepared from iron fumarate before and after the performance of the catalyst is evaluated.

The pore distribution of the iron fumarate particles used in Example 2 and the pore distribution of the catalyst ($Fe_3O_4$ derived from iron fumarate) particles prepared in Example 2 after the above catalyst performance was evaluated were measured in the same manner as in Example 3A. The results are shown in FIG. 6. In FIG. 6, the line a (triangular mark) shows the results of the iron fumarate particles and the line b (circular mark) shows the results of the catalyst particles after the performance of the particles was evaluated.

As shown in FIG. 6, the iron fumarate particles have almost no nanopore (line a). However, the catalyst ($Fe_3O_4$) particles derived from iron fumarate after the catalyst performance is evaluated, as shown by the line b, have a pore distribution very similar to that (the line b in FIG. 5) of the catalyst ($Fe_3O_4$) particles derived from citric acid as shown in FIG. 5. This suggests that the catalyst ($Fe_3O_4$) particles prepared in Example 2 have nanopores and the nano-structure is maintained even after they are heat-treated at 600° C. for 3.5 hours.

From the results shown in FIG. 5 and FIG. 6, it is considered that the above maintained nanopore structure contributes to improvement in the carbon monoxide reduction capability of $Fe_3O_4$ derived from iron fumarate and iron citrate under a high-temperature atmosphere (600° C.) as is proved in Examples 1 and 2.

COMPARATIVE EXAMPLE 2

Figure 7:
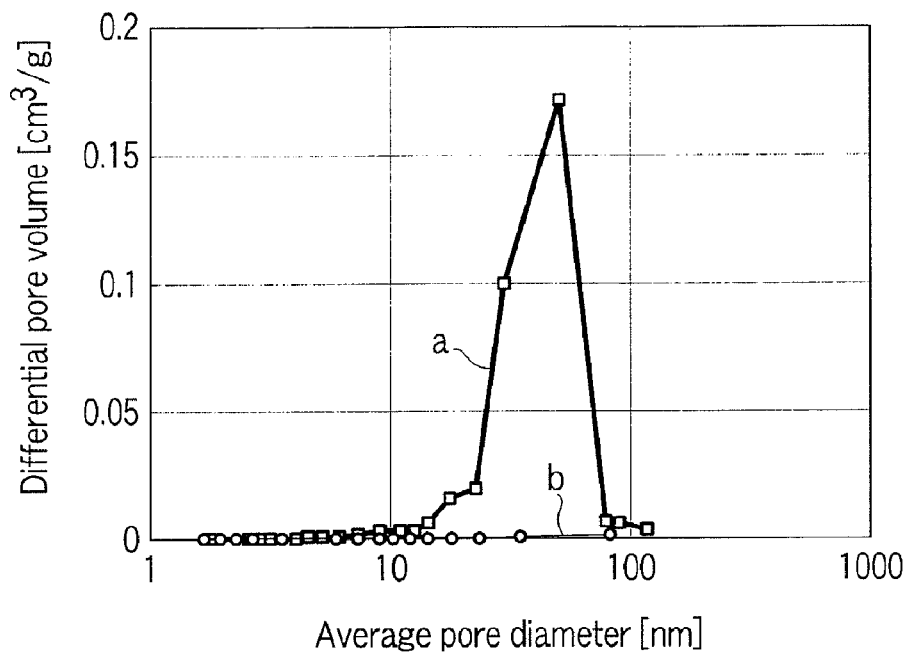
FIG. 7 is a graph showing the pore distributions of $Fe_3O_4$ nano-powder catalyst before and after the performance of the catalyst is evaluated.

The pore distribution of the $Fe_3O_4$ nano-powder (manufactured by Sigma-Aldrich Corporation) used in Comparative Example 1 and the pore distribution of the nano-powder after the above catalyst performance was evaluated were measured in the same manner as in Example 3A. The results are shown in FIG. 7. It is clarified from FIG. 7 that though the $Fe_3O_4$ nano-powder has nanopores as shown by the line a (square mark) in FIG. 7 before the evaluation of the catalyst performance (heated at 600° C. for 3.5 hours), almost of the nanopore structure disappears after the catalyst performance is evaluated as shown by the line b (circular mark). Specifically, it is clarified that disintegration of nanopores caused by the coagulation of primary particles occurs. This is considered to be the reason why the carbon monoxide reduction capability is deteriorated during evaluation of catalyst performance in Comparative Example 1.

EXAMPLES 4 AND 5

In these Examples, the influence of the heating temperature in the preparation of the catalyst was investigated.

A catalyst ($Fe_3O_4$) was prepared from iron fumarate in the same manner as in Example 2 except that the temperature in the preparation of the catalyst was changed to 500° C. (Example 4) and 700° C. (Example 5) from 600° C. The generation of $Fe_3O_4$ was confirmed in the same manner as in Example 2.

The performance of the catalyst was evaluated in the same manner as in Example 2 except that the catalyst obtained in this example was used. The results are shown in Table 2. The results of evaluation of Example 2 are described again in Table 2.

TABLE 2

| | | Heating temperature in the preparation of the catalyst | | Performance of catalyst | | | |
|---|---|---|---|---|---|---|---|
| | Precursor Compound | | Catalyst Compound | Amount of iron [a] | CO oxidation amount [b] | CO/Fe [c] | CO removal rate [d] |
| | — | ° C. | — | g | mmol | % | % | % |
| Ex. 4 | Iron (II) | 500 | $Fe_3O_4$ | 0.15 | 180.5 | 218.2 | 201.1 | 44.6 |
| Ex. 2 | fumarate | 600 | $Fe_3O_4$ | 0.15 | 180.5 | 243.7 | 224.6 | 51.7 |
| Ex. 5 | | 700 | $Fe_3O_4$ | 0.15 | 180.5 | 94 | 86.6 | 21.7 |

[a], [b], [c] and [d] are the same as those in Table 1.

As is clear from Table 2, the catalyst (Example 2) obtained by heating at 600° C. exhibited the highest oxidation amount of carbon monoxide, the highest oxidation amount of carbon monoxide per mol of an iron element and the highest carbon monoxide removal rate.

The catalyst (Example 4) obtained by heating at 500° C. also exhibited a high catalyst performance. However, there was a tendency that the catalyst (Example 5) obtained by heating at 700° C. was deteriorated in the oxidation amount of carbon monoxide, oxidation amount of carbon monoxide per mol of an iron element and carbon monoxide removal rate.

EXAMPLE 6

The influence of the gas atmosphere when preparing a catalyst from an organic acid transition metal salt (catalyst precursor) on the carbon monoxide reduction capability of the obtained catalyst was evaluated. In this example, iron fumarate used in Example 2 was used as the catalyst precursor.

A catalyst ($Fe_3O_4$) was prepared in the same manner as in Example 2 except that the gas atmosphere to be used was changed to an atmosphere of each of the following 8 types of gas mixtures from the atmosphere of a gaseous mixture of 10 mol % $CO_2$/balance $N_2$. The generation of $Fe_3O_4$ was confirmed in the same manner as in Example 2.

Used gas mixture:
Gas mixture I: 10 mol % $CO_2$/balance $N_2$;
Gas mixture II: 5 mol % $CO_2$/balance $N_2$;
Gas mixture III: 2 mol % $CO_2$/balance $N_2$;
Gas mixture IV: 5 mol % $O_2$/balance $N_2$;
Gas mixture V: 2 mol % $O_2$/balance $N_2$;
Simulation gas (1): 4 mol % CO/8 mol % $CO_2$/10 mol % $H_2O$/balance $N_2$;
Simulation gas (2): 4 mol % CO/8 mol % $CO_2$/balance $N_2$;
Gas mixture VI: 10 mol % $H_2O$/balance $N_2$.

The performance of the obtained catalyst was evaluated in the same manner as in Example 2. The calculated maximum CO oxidation amount per mol of an iron element (see Notes b and c in Table 1) is shown in FIG. 8.

Figure 8:
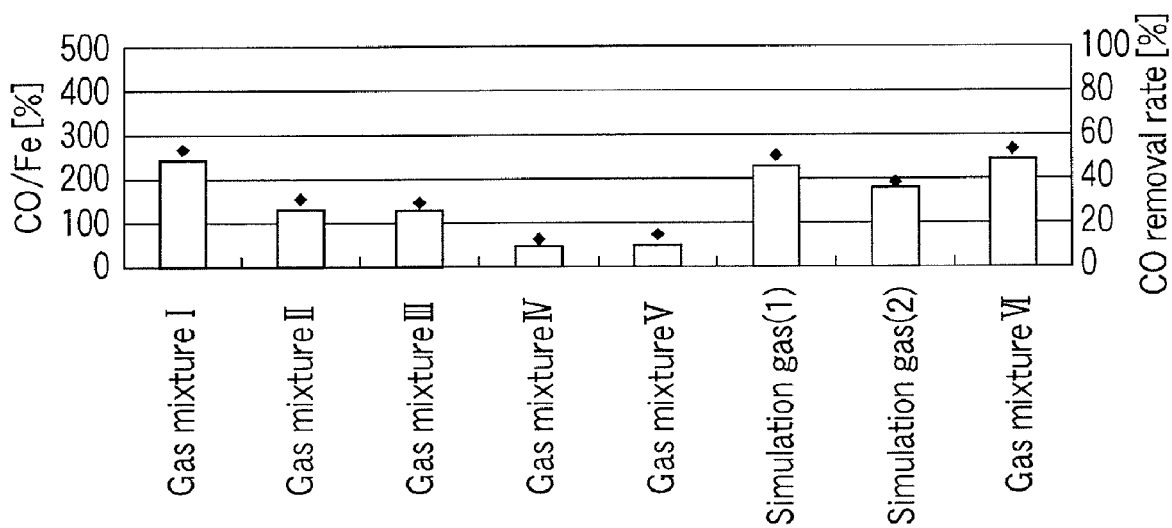
FIG. 8 is a graph showing the influence of the gas atmosphere under which a catalyst is prepared from a catalyst precursor on the carbon monoxide removal rate of the catalyst produced.

As shown in FIG. 8, it was found that a catalyst exhibiting high carbon monoxide reduction capability was produced when gaseous mixture I, simulation gas (1) or (2) or gaseous mixture VI was used as the gas in the production of iron fumarate.

EXAMPLE 7

Figure 9:
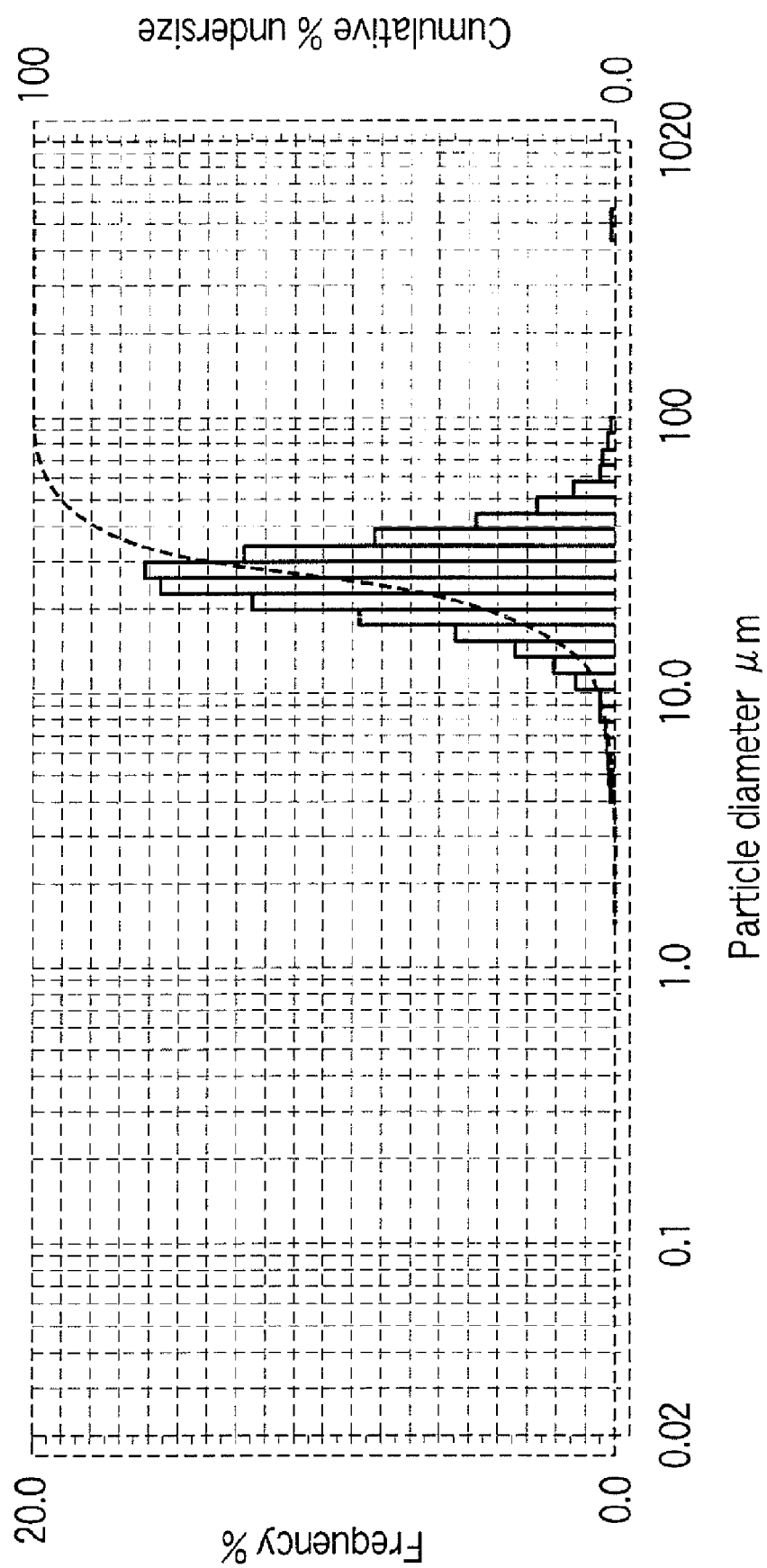
FIG. 9 is a graph showing the grain size distribution of an iron oxide catalyst ($Fe_3O_4$) derived from iron fumarate.

The grain size distribution of iron oxide derived from iron fumarate prepared in Example 2 was measured. The grain size distribution was measured using a laser diffraction/scattering type grain size distribution measuring device (trade name: LA-910, manufactured by Horiba Ltd.). The results are shown in FIG. 9. Looking at the frequency in FIG. 9, 90% or more of the particles have a size ranging from 1 to 100 μm with the center grain diameter being 28.55 μm. This measurement is made by the laser diffraction/scattering method and is based on calculation of grain size distribution on volume basis.

EXAMPLE 8

145 g of the catalyst (iron oxide derived from iron fumarate) obtained in Example 2 and 15 g of flax pulp (manufactured by Rinsel (Company)) were dispersed in 2000 g of an organic solvent (mixture solution of ethanol and lecithin [90: 0.5 by weight]) to prepare a slurry. This slurry was cast into a sheet form, or made to flow on a manual paper making tool manufactured by overlapping a 16 mesh stainless wire gauge on a 200 mesh stainless wire gauge to manufacture tobacco cigarette paper having a basis weight of 50 g/m². In this case, it was found that if the particle diameter of iron oxide was too large, the smoothness of the cigarette paper was deteriorated, whereas if the particle diameter was too small, the iron oxide particles passed through the manual paper making tool, so that the iron oxide particles could not be carried.

Further, iron oxide derived from iron fumarate was dispersed in 30 ml of a mixture solution of ethanol and lecithin to prepare a slurry. The above slurry was sprayed using an atomizer such that the amount of iron oxide was 10% by weight based on the weight of shredded tobacco, thereby enabling the addition of iron oxide to the shredded tobacco.

What is claimed is:

1. A method for producing a catalyst useful for reducing carbon monoxide in tobacco mainstream smoke, comprising heating particles of an iron salt of an organic acid at a temperature from 200 to 700° C. to convert the iron salt into an iron oxide.

2. The method according to claim 1, wherein the heating is carried out in an atmosphere of $CO_2$, $N_2$, $H_2O$ or CO gas or an atmosphere of a gaseous mixture of two or more of these gases mixed together.

3. The method according to claim 2, wherein the organic acid is fumaric acid or citric acid.

4. The method according to claim 2, wherein the heating is carried out in an atmosphere of a gaseous mixture of 5 to 20 mol % of $CO_2$ and a balance of $N_2$.

5. The method according to claim 2, wherein the heating is carried out in an atmosphere of a gaseous mixture of 1 to 10 mol % of CO, 5 to 20 mol % of $CO_2$, 5 to 20 mol % of $H_2O$ and a balance of $N_2$.

6. The method according to claim 2, wherein the heating is carried out in an atmosphere of a gaseous mixture of 5 to 20 mol % of $H_2O$ and a balance of $N_2$.

7. The method according to claim 1, wherein the organic acid is fumaric acid or citric acid.

* * * * *